United States Patent
Czajka et al.

(10) Patent No.: US 11,768,926 B2
(45) Date of Patent: Sep. 26, 2023

(54) METHOD OF TEXTURED CONTACT LENS DETECTION

(71) Applicant: UNIVERSITY OF NOTRE DAME DU LAC, South Bend, IN (US)

(72) Inventors: Adam Czajka, Sound Bend, IN (US); Kevin Bowyer, South Bend, IN (US); Zhaoyuan Fang, South Bend, IN (US)

(73) Assignee: University of Notre Dame Du Lac, South Bend, IN (US)

( * ) Notice: Subject to any disclaimer, the term of this patent is extended or adjusted under 35 U.S.C. 154(b) by 179 days.

(21) Appl. No.: 17/264,495

(22) PCT Filed: Oct. 24, 2019

(86) PCT No.: PCT/US2019/057829
§ 371 (c)(1),
(2) Date: Jan. 29, 2021

(87) PCT Pub. No.: WO2020/086824
PCT Pub. Date: Apr. 30, 2020

(65) Prior Publication Data
US 2021/0319239 A1    Oct. 14, 2021

Related U.S. Application Data

(60) Provisional application No. 62/749,864, filed on Oct. 24, 2018.

(51) Int. Cl.
*G06K 9/00* (2022.01)
*G06K 9/20* (2006.01)
(Continued)

(52) U.S. Cl.
CPC .............. *G06F 21/32* (2013.01); *G06V 40/18* (2022.01); *G06V 40/197* (2022.01); *G06V 40/40* (2022.01)

(58) Field of Classification Search
CPC .... G06V 40/40; G06V 40/197; G06V 10/145; G06V 40/171; G06V 40/18; G06V 40/20; G06V 40/16; G06V 10/143
See application file for complete search history.

(56) References Cited

U.S. PATENT DOCUMENTS 5,291,560 A     3/1994  Daugman
6,055,322 A  *  4/2000  Salganicoff ............ A61B 3/156
                                                       382/117
(Continued)

OTHER PUBLICATIONS

International Search Report and Written Opinion issued in PCT/US2019/057829, dated Dec. 31, 2019.

*Primary Examiner* — Edward F Urban
*Assistant Examiner* — Duy Tran
(74) *Attorney, Agent, or Firm* — WORKMAN NYDEGGER

(57) ABSTRACT

Systems and methods for detecting textured contact lenses in an iris image are disclosed. Initially, "K" images are taken of an eye in near-infrared light, each for a different positioning of the illuminant. Three-dimensional properties of the hypothetical iris are estimated based on image processing methods. The variability of the estimated three-dimensional properties is calculated, and a classification into two classes is made based on the variability. A low variability denotes that an authentic iris pattern was presented to the sensor, whereas a high variability denotes that the sensor observes an eye wearing a textured contact lens. The systems and methods disclosed allow for detecting presentation attacks to iris recognition systems/sensors based on presentation of an eye wearing a textured contact lens in an automatic and accurate way.

18 Claims, 9 Drawing Sheets

(51) Int. Cl.
*G06F 21/32* (2013.01)
*G06V 40/40* (2022.01)
*G06V 40/18* (2022.01)

(56) References Cited

U.S. PATENT DOCUMENTS

| | | | |
|---|---|---|---|
| 2006/0062438 A1* | 3/2006 | Rowe | G06V 40/1388 |
| | | | 382/124 |
| 2013/0089241 A1* | 4/2013 | Malhas | G06V 40/45 |
| | | | 382/117 |
| 2013/0308100 A1 | 11/2013 | Mensink | |
| 2015/0098629 A1 | 4/2015 | Pernal et al. | |
| 2016/0027208 A1* | 1/2016 | Pham | G06T 7/66 |
| | | | 382/103 |
| 2016/0210754 A1* | 7/2016 | Ida | G06T 7/586 |
| 2017/0045803 A1* | 2/2017 | Braithwaite | G02B 6/0003 |
| 2017/0091550 A1* | 3/2017 | Feng | G06T 3/4061 |
| 2017/0323167 A1* | 11/2017 | Mapen | G06T 7/97 |

\* cited by examiner

METHOD OF TEXTURED CONTACT LENS DETECTION

CROSS-REFERENCE TO RELATED APPLICATIONS

This Application claims priority to PCT Application No. PCT/US2019/057829, filed Oct. 24, 2019, entitled "METHOD OF TEXTURED CONTACT LENS DETECTION", which claims priority to U.S. provisional patent application 62/749,864 filed Oct. 24, 2018 entitled "METHOD OF OCULAR CONTACT LENS DETECTION". All the aforementioned applications are incorporated by reference herein in their entirety.

BACKGROUND OF THE INVENTION

Technical Field

The present disclosure relates generally to biometric sensors for confirming a person's identity. More specifically, the present disclosure relates to presentation attack detection (PAD) in iris recognition sensors.

Background and Relevant Art

The use of biometric sensors for security purposes has become pervasive. For example, facial recognition and/or fingerprint recognition systems are now commonly found on handheld computing devices and are typically used to unlock or enable use of such devices. Iris sensor devices are also often used for security purposes, for example, to allow entry into a space or utilization of a device in response to detecting that the iris presented to the sensor matches a reference iris stored in a database. Many consider iris recognition to be one of the most accurate and/or secure biometric security methods.

Presentation attacks are those presentations to the biometric sensors which aim at either impersonating someone else or concealing the attacker's identity. Such attacks may be carried out in various ways. For instance, a presentation attacker might present an artificial object to a biometric sensor, such as a gummy finger, silicone face mask, or a prosthetic eye. In other instances, a presentation attacker engages in non-conforming use of a biometric sensor system, such as squinting their eyes, rotating their finger, or changing facial expressions. Some presentation attackers may theoretically go so far as presenting severed body parts to a biometric sensor in order to impersonate a deceased person.

Despite iris recognition being regarded as a highly accurate and/or secure biometric-based security method, iris recognition systems are susceptible to presentation attacks. For example, iris recognition systems are susceptible to wrongfully granting access to a presentation attacker who presents an iris printout to the iris recognition sensor that matches an acceptable reference iris.

In another example, iris recognition systems are susceptible to wrongfully granting access to a presentation attacker who presents a textured contact lens disposed over a real eye to the iris recognition sensor. A textured contact lens can have texturing that simulates an acceptable reference iris, thereby fooling the iris recognition sensor. Alternatively, a textured contact lens may obscure the visibility of the true iris, so that the presentation attacker can avoid being matched to an identity on a "watch list". Presentation attacks utilizing a textured contact lens can be especially dangerous because textured contact lenses are often worn for cosmetic purposes. Therefore, presentation attackers may easily conceal their intention to present an eye to an iris recognition sensor that is covered by a textured contact lens. Thus, the inability of conventional iris recognition systems to detect textured contact lenses can be particularly disturbing.

In sum, there are a number of disadvantages in the art of iris recognition systems.

SUMMARY OF INVENTION

There is a need for iris recognition sensors and systems that can accurately detect whether an eye being scanned by the sensor has a textured contact lens disposed over it. Disclosed embodiments refer to systems and methods for detecting whether or not an eye presented to an iris recognition sensor wears a textured (e.g., cosmetic) contact lens. This is important because a textured contact lens, if placed on the cornea, interferes with authentic iris texture and prevents the iris recognition systems from correctly identifying the presenting individual. Textured contact lenses are commonly used in presentation attacks, in which attackers want to conceal their identity.

In accordance with the embodiments disclosed herein, determining whether an eye has a textured contact lens on the cornea is accomplished by estimating three-dimensional properties of the eye (or other object) presented to the sensor.

An authentic iris is approximately flat. A contact lens including texturing and/or printing is a smooth curved surface, but the surface imaged by the sensor appears as irregular because it is effectively part on the lens and part on the iris. This observable difference in surface regularity is utilized according to the present disclosure in order to determine the authenticity of an iris presented to an iris recognition sensor. Disclosed systems and methods for estimating the irregularity of a three-dimensional surface of an object presented to an iris sensor use a single camera lens and two (or more) illuminants placed at two (or more) different angles relative to the camera lens. The camera is positioned to capture images of the presented object (e.g., iris and/or contact lens), and the illuminants are positioned to illuminate the presented object. Because a textured contact lens has a comparatively irregular surface, shadows generated on the authentic iris tissue when the textured contact lens placed on the cornea is illuminated will be different when different illuminants are used from different angles. In contrast, because an authentic iris is approximately flat, shadows generated when the authentic iris is illuminated will be approximately the same, even when the iris is illuminated from different illuminants from differing angles.

Upon capturing images with the camera lens showing the presented object being illuminated by each desired illuminant, disclosed systems and methods utilize a photometric stereo method to translate the features of the captured images (e.g., observed shadows) into vectors that are normal to the observed surface. For an authentic (i.e., almost planar) iris, the estimated normal vectors are close to the average normal vector estimated for the entire surface. In turn, for an eye wearing a patterned contact lens, the estimated normal vectors diverge from the average normal vector. Thus, the variance of a difference between the average normal vector and all estimated normal vectors is lower for authentic irises than for eyes wearing patterned contact lenses. This variance is used as a score indicating the authenticity of the object presented to the camera. A threshold score can be set for determining whether the object presented to the camera includes a textured contact lens.

Accordingly, disclosed systems and methods comprise steps of illuminating an eye with k illuminants, acquiring an iris image for each of the k illuminants, and determining, using one or more processors, the presence of a textured contact lens based on an analysis of the estimated surface shape of a selected portion of an iris determined within the acquired iris images. Determining the presence of a textured contact lens may include calculating normal vectors to the observed surface based on the acquired iris images, calculating a nonoccluded portion of the iris annulus based on the acquired iris images, and determining a variance of the normal vectors to the observed surface found within the nonoccluded portion of the iris annulus. Calculating vectors $n_{x,y}$ normal to the observed surface may be performed by a photometric stereo method, such as wherein $$n_{x,y} = \frac{\hat{n}}{\|\hat{n}\|}, \text{ and } \hat{n} = \begin{cases} L^{-1}I_{x,y} & \text{if } k = 3 \\ (L^{T}L)^{-1}L^{T}I_{x,y} & \text{if } k \neq 3 \end{cases};$$

where $I_{x,y}$ is a vector of the observed k intensities at each (x, y) pixel location of the acquired iris images, L is a 3×k matrix of k known light directions, $(L^{T}L)^{-1}L^{T}$ is a Moore-Penrose pseudoinverse of L, and $\|x\|$ is the norm of x. Additionally, calculating the variance may comprise calculating var(q), where q is a vector composed of all elements of $q_{x,y}$, and $q_{x,y}=\|n_{x,y}-\bar{n}\|$, $\|x\|$ is the norm of x, and $$\bar{n} = \frac{1}{N}\sum_{x,y}n_{x,y},$$

N is a number of nonoccluded iris points, and $n_{x,y}$ comprises normal vectors calculated for the nonoccluded iris points.

In one aspect of the disclosed systems and methods, determining the presence of a textured contact lens comprises comparing the variance var(q) with an acceptance threshold for a given dataset of iris images. In another aspect, determining the presence of a textured contact lens comprises determining the iris is not covered by the textured contact lens if the variance var(q) does not meet or exceed the acceptance threshold. In another aspect, determining the presence of a textured contact lens comprises determining the iris is covered by the textured contact lens if the variance meets or exceeds the acceptance threshold.

In one aspect of the disclosed systems and methods, at least two illuminants are used in succession. In another aspect, the illuminants are not positioned concentrically with a camera lens used to acquire the iris image. In another aspect, the illuminants are positioned coplanar with the camera lens used to acquire the iris images, such that the illuminants and the camera lens are positioned on a plane that is orthogonal to an optic axis of the camera lens.

In one aspect of the disclosed systems and methods, the selected portion of the iris comprises a nonoccluded portion of an iris annulus. In another aspect, calculating the nonoccluded portion of the iris annulus comprises classifying each pixel within the acquired iris images into a pixel class. In another aspect, the pixel class comprises iris texture or background.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION OF THE PREFERRED EMBODIMENTS

Figure 1A:
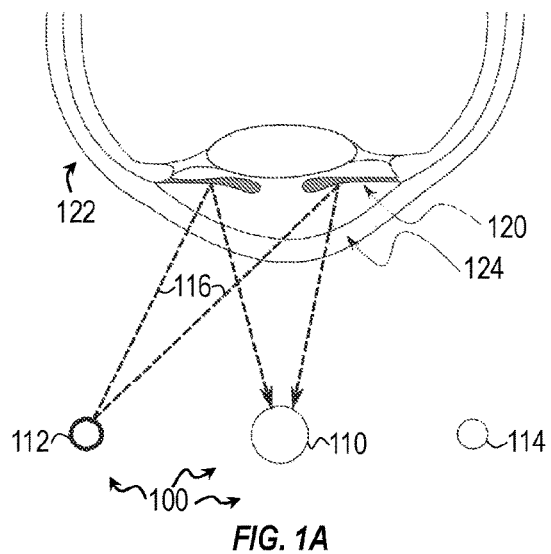
FIGS. 1A and 1B illustrate conceptual representations of a system for detecting a textured contact lens capturing images of an iris with no intervening textured contact lens.

Before describing various embodiments of the present disclosure in detail, it is to be understood that this disclosure is not limited to the parameters of the particularly exemplified systems, methods, apparatus, products, kits, and/or processes, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Unless defined otherwise, all technical and scientific terms used herein have the same meaning as commonly understood by one of ordinary skill in the art to which the present disclosure pertains.

While the detailed description is separated into sections, the section headers and contents within each section are not intended to be self-contained descriptions and embodiments. Rather, the contents of each section within the detailed description are intended to be read and understood as a collective whole where elements of one section may pertain to and/or inform other sections. Accordingly, embodiments specifically disclosed within one section may also relate to and/or serve as additional and/or alternative embodiments in another section having the same and/or similar systems, modules, devices, methods, and/or terminology.

Presentation attacks are those presentations to the biometric sensors which aim at either impersonating someone else or concealing the attacker's identity. Such attacks may be carried out in various ways. For instance, a presentation attacker might present an artificial object to a biometric sensor, such as a gummy finger, silicone face mask, or a prosthetic eye. In other instances, a presentation attacker engages in non-conforming use of a biometric sensor system, such as by squinting their eyes, rotating their finger, or changing facial expressions. Some presentation attackers go so far as presenting severed body parts to a biometric sensor in order to impersonate a deceased person.

Despite iris recognition being regarded as a highly accurate and/or secure biometric-based security method, iris recognition systems are also susceptible to presentation attacks. For example, iris recognition systems are susceptible to wrongfully granting access to a presentation attacker who presents an iris printout to the iris recognition sensor that matches an acceptable reference iris.

In another example, iris recognition systems are susceptible to wrongfully granting access to a presentation attacker who presents a textured contact lens disposed over a real eye to the iris recognition sensor. A textured contact lens can have texturing that simulates an acceptable reference iris, thereby fooling the iris recognition sensor. Presentation attacks utilizing a textured contact lens can be especially dangerous because textured contact lenses are often worn for cosmetic purposes. Therefore, presentation attackers may easily conceal their intention to present an eye to an iris recognition sensor that is covered by a textured contact lens. Thus, the inability of conventional iris recognition systems to detect textured contact lenses can be particularly disturbing.

Because of the shortcomings of conventional iris recognition systems, iris presentation attack detection (PAD) has received considerable attention, especially in recent years. One approach developed for iris recognition systems to distinguish non-eye, flat objects (printed irises) from a living eye is to detect corneal reflections of infrared light illuminated in random sequences. The cornea has a spherical shape and, due to its moistness, generates specular reflections at the positions possible to be estimated when the positions of the illuminators are given. Lambertian flat surfaces (such as printed irises) will not generate specular highlights and thus can be classified as non-eye objects. However, although such an approach may be useful for detecting printed irises, this approach fails to detect textured contact lenses, which may generate specular reflections due to their spherical shape and moistness.

Another approach uses a structured light method, wherein a predefined light pattern (e.g., light stripes) is projected onto an observed object, and the three-dimensional properties of the observed object can then be observed and estimated by an appropriate camera system based on the manner in which the known light pattern is reflected by the observed object. The system determines whether the observed object is approximately flat (e.g., an authentic iris) or includes curved or irregular features (e.g., a textured contact lens). Other approaches use a stereo camera depth detection method to determine surface features of the observed object (e.g., by measuring the disparity between left and right camera images on a per-pixel basis. High surface irregularity is associated with a textured contact lens, whereas low surface is associated with an authentic iris. These approaches, however, require elaborate sensor and/or camera systems that are not found in conventional iris recognition sensor systems, and therefore cannot be implemented without significant hardware modification.

The present disclosure relates to iris PAD systems and methods that employ photometric stereo to make a distinction between an approximately flat authentic iris, and an irregular and/or convex shape of a textured contact lens.

Approximately planar objects, such as a surface of an authentic iris, do not cast significant shadows when illuminated at an angle, and hence images acquired by the same camera, even when illuminated from different illuminants at different angles, appear similar. In turn, for non-planar objects, such as a combination of an iris and a patterned contact lens, shadows generated by different illuminants placed at different angles appear different when observed by the same camera lens. For image resolutions used in commercial iris recognition systems, an authentic iris generally appears as an approximately flat object placed behind the spherical cornea and anterior chamber of an eyeball. However, a textured contact lens, if placed on the cornea, makes the observed object convex. Additionally, irregular printing on the textured contact lens makes the three-dimensional opaque surface of textured contact lens appear highly irregular when compared to an authentic iris.

This observable difference in surface regularity is utilized according to the present disclosure in order to determine the authenticity of an iris presented to an iris recognition sensor. Disclosed systems and methods for estimating the irregularity of a three-dimensional surface of an object presented to an iris sensor use a single camera lens and two (or more) illuminants placed at two (or more) different angles relative to the camera lens. The camera is positioned to capture images of the presented object (e.g., iris and/or contact lens), and the illuminants are positioned to illuminate the presented object. Because a textured contact lens has a comparatively irregular surface, shadows generated when the textured contact lens is illuminated will be different when different illuminants are used from different angles. In contrast, because an authentic iris is approximately flat, shadows generated when the iris is illuminated will be approximately the same, even when the iris is illuminated from different illuminants from differing angles.

Upon capturing images with the camera lens showing the presented object being illuminated by each desired illuminant, disclosed systems and methods utilize a photometric stereo method to translate the features of the captured images (e.g., observed shadows) into vectors that are normal to the observed surface. For an authentic (i.e., almost planar) iris, the estimated normal vectors are close to the average normal vector estimated for the entire surface. In turn, for an eye wearing a patterned contact lens, the estimated normal vectors diverge from the average normal vector. Thus, the variance of a difference between the average normal vector and all estimated normal vectors is lower for authentic irises than for eyes wearing patterned contact lenses. This variance is used as a score indicating the authenticity of the object presented to the camera. A threshold score can be set for determining whether the object presented to the camera includes a textured contact lens.

Advantageously, in many instances, the hardware of common commercial sensors is sufficient for implementing the systems and methods disclosed herein. In particular, two near-infrared illuminators placed at different locations relative to are camera lens are sufficient to capture the images required to carry out the disclosed methods. Iris sensors with illuminators at two locations relative to the camera include, for example, the LG 4000, Iris Guard AD 100, Panasonic ET 300 and others. Some iris sensors include more than two illuminators, such as the OKI Iris Pass M, which has illuminators in four locations. Iris sensors with illuminators at two or more locations are common, particularly because utilizing two or more illuminators can operate to minimize specular highlight on the iris.

The two captured images are used for estimating the normal vectors for the observed surface. These normal vectors are more consistent for a flat iris than for irregular textured contact lens. The estimated variability of the calculated normal vectors serves as the PAD score, which is smaller for authentic eyes than for eyes wearing textured contact lenses. Consequently, an important practical advantage of the proposed systems and methods is that they can be seamlessly implemented in present sensors that generate ISO/IEC 19794-6-complaint iris images, without any hardware updates.

Systems for Textured Contact Lens Detection

The embodiments disclosed herein will now be described by reference to some more detailed embodiments, with occasional reference to any applicable accompanying drawings. These embodiments may, however, be embodied in different forms and should not be construed as limited to the embodiments set forth herein. Rather, these embodiments are provided so that this disclosure will be thorough and complete, and will fully convey the scope of the embodiments to those skilled in the art.

Figure 1B:
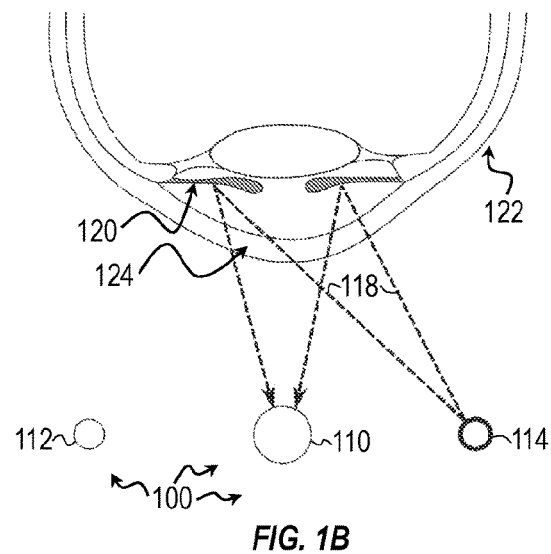

FIGS. 1A and 1B illustrate conceptual representations of a system 100 for detecting a textured contact lens capturing images of an iris 120 with no intervening textured contact lens. System 100 includes a camera lens 110, a first light source 112, and a second light source 114. In some instances, the light sources 112 and 114 are implemented as light emitting diodes (LEDs) configured for emitting near-infrared light (e.g., light with wavelengths within 700 nm to 900 nm), although other light sources and/or wavelengths could be used. Many existing iris recognition sensors utilize LEDs that emit near-infrared light.

As shown, the first light source 112 is positioned on one side of the camera lens 110, while the second light source 114 is positioned on the other side of the camera lens. Both light sources 112, 114 are illustrated as being positioned equidistant from the camera lens 110, and the light sources 112, 114 are shown as being positioned concentrically with the camera lens 110. Furthermore, the light sources are depicted as being positioned coplanar with the camera lens (e.g., the camera lens 110 and the light sources 112, 114 are arranged on a plane that is coplanar to an optic axis of the camera lens 110). However, other arrangements may be utilized to practice the methods disclosed herein. For example, the first light source 112 may be arranged closer to the camera lens 110 than the second light source 114, such that the sensors are not positioned concentrically with the camera lens 110. Furthermore, in another example, the first light source 112 may be positioned closer to the eye 122 than the camera lens 110 and/or the second light source 114, such that the sensors and the camera lens 110 are not all coplanar with one another.

Furthermore, although only first and second light sources 112, 114 are shown in FIGS. 1A and 1B, those skilled in the art will recognize that more than two light sources may be implemented within the scope of the present disclosure. For example, aspects of the present disclosure may be implemented with the hardware arrangement present in the OKI Iris Pass M iris recognition system, which includes illuminators in four distinct locations. Indeed, any number of illuminators (e.g., k illuminators) may be utilized within the scope of this disclosure.

The first and second light sources 112, 114 are arranged for emitting near-infrared light toward the iris 120 (as shown by illustrative rays 116 in FIG. 1A and 118 in FIG. 1B), and at least some of this light reflects off of the iris 120 for detection by camera lens 110. FIG. 1A shows the first light source 112 emitting light that transmits through the cornea 124 and is then reflected off of the iris 120 toward the camera lens 110 (transmitting again through the cornea 124), and FIG. 1B shows the second light source 114 emitting light from a different angle that is reflected off of the iris 120 toward the camera lens 110. It should be noted that both light sources 112 and 114 are not shown as emitting light for reflection off of the iris 120 simultaneously. This is because at least two images taken under two different lighting conditions are necessary in order to perform a photometric stereo method for estimating normal vectors associated with the observed surface (as discussed in more detail with reference to FIGS. 5A and 5B).

Accordingly, as represented in FIGS. 1A and 1B, the camera lens 110 captures an image of the iris 120 under different lighting conditions in a successive fashion. Under one lighting condition, the iris 120 is illuminated by the first light source 112 (FIG. 1A), and under another lighting condition, the iris 120 is illuminated by the second light source 114 (FIG. 1B). In some implementations, because of spontaneous oscillation in pupil size and/or potential spontaneous movement of the presenter's eye, the time between successive image captures under different lighting conditions should be minimized.

It will be appreciated that for any number of illuminants (e.g., k illuminants), the system 100 captures an iris image for each of at least two illuminants, up to the number of illuminants present (e.g., system 100 acquires an iris image for each of the k illuminants). After a system 100 acquires all appropriate images, the system 100 determines whether a textured contact lens is present based on an analysis of the estimated surface shape of a selected portion of the iris determined within the acquired iris images (e.g., by photometric stereo and variance determinations, as discussed hereinafter).

Figure 2A:
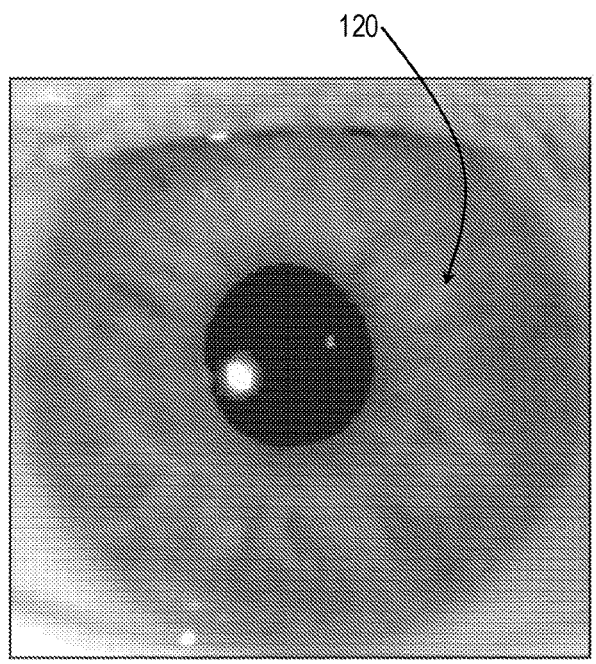
FIGS. 2A and 2B illustrate exemplary images captured by a system for detecting a textured contact lens of an iris with no intervening textured contact lens.
Figure 2B:
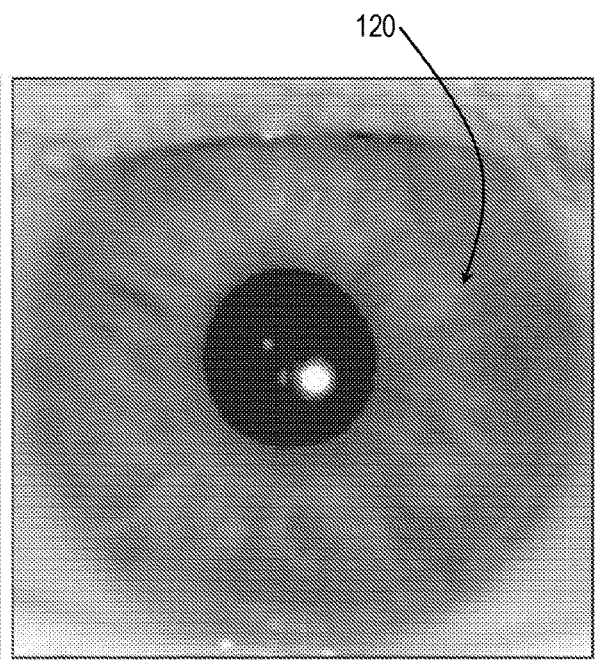

FIGS. 2A and 2B illustrate exemplary images captured by a system for detecting a textured contact lens of an iris 120 with no intervening textured contact lens. The captured images shown in FIGS. 2A and 2B correspond to the different illumination conditions presented in FIGS. 1A and 1B. In particular, FIG. 2A shows an image captured by camera lens 110 when the light source 112 illuminated the iris 120 (as shown in FIG. 1A), whereas FIG. 2B shows an image captured by camera lens 110 when the light source 114 illuminated the iris 120 (as shown in FIG. 1B).

The externally visible surface of the iris can be considered as a more Lambertian than specular surface. Accordingly, the images captured by the camera lens 110 shown in FIGS. 2A and 2B are similar, even though the images were captured under differing illumination conditions. The iris surface is not perfectly flat, however, resulting in at least some difference in the shadows visible in FIGS. 2A and 2B. Even so, the resolution of commercial iris recognition sensors compliant to ISO/IEC 19794-6 is rather small when compared to the size of three-dimensional objects such as eye crypts. Therefore, even though a natural iris is not perfectly flat, the observed differences between the iris images shown in FIGS. 2A and 2B are small. Because of this similarity, normal vectors estimated by a photometric stereo method will not excessively differ from the average normal vector estimated for the observed object (as discussed in more detail hereinafter). Thus, the reconstruction of the observed natural iris results in a roughly planar surface estimation of the natural iris.

Figure 3A:
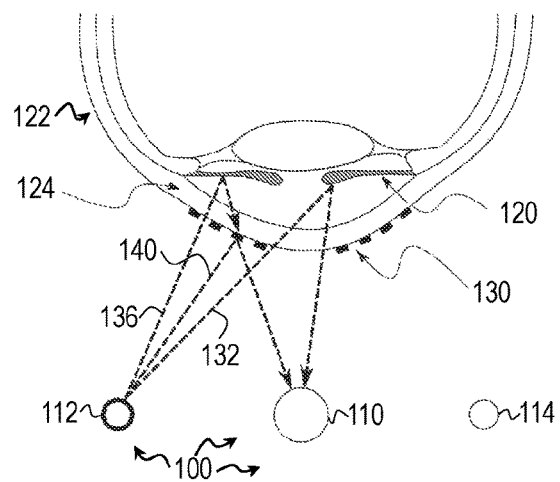
FIGS. 3A and 3B illustrate conceptual representations of a system for detecting a textured contact lens capturing images of an iris with an intervening textured contact lens.
Figure 3B:
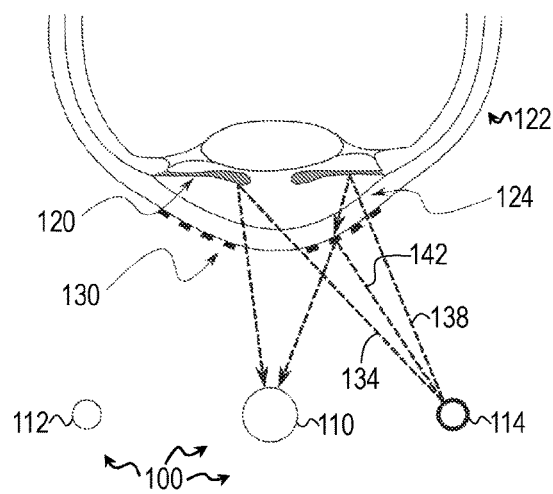

FIGS. 3A and 3B illustrate conceptual representations of a system 100 for detecting a textured contact lens capturing images of an iris 120 with an intervening textured contact lens 130. System 100 includes many of the same hardware elements described above with reference to FIGS. 1A and 1B (e.g., light sources 112, 114, camera lens 110), however the eye 122 presented in FIGS. 3A and 3B has a textured contact lens 130 disposed thereover. The textured contact lens 130 has an at least partially opaque texture disposed thereon. As a result the light emitted from the light sources 112, 114 toward the iris 120 either (1) transmits through the cornea 124, reflects off of the iris 120, and transmits through the cornea 124 again (e.g., toward the camera lens 110, as depicted by rays 132 and 134), (2) transmits through the cornea 124, reflects off of the iris 120, and becomes blocked by the opaque texture of the textured contact lens 130 (as depicted by rays 136 and 138), or (3) reflects off of the opaque texture of the textured contact lens 130 toward the camera lens 110 (as depicted by rays 140 and 142).

It should be briefly noted that, in some instances, because non-textured contact lenses do not include opaque elements, non-textured contact lenses do not affect the illumination of an authentic iris of an eye to the same degree that textured contact lenses do. Accordingly, at least some systems and methods of the present disclosure are able to distinguish between textured contact lenses and non-textured contact lenses, recognizing only the presence of textured contact lenses as a potential presentation attack.

Figure 4A:
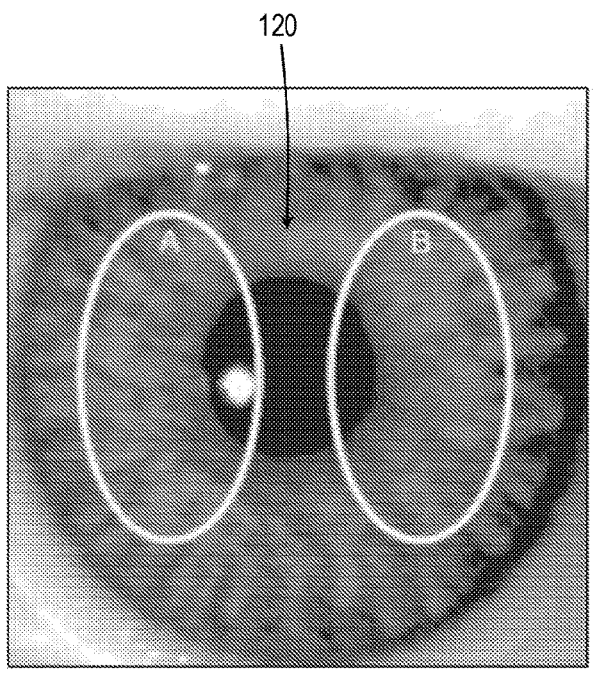
FIGS. 4A and 4B illustrate exemplary images captured by a system for detecting a textured contact lens of an iris with an intervening textured contact lens.
Figure 4B:
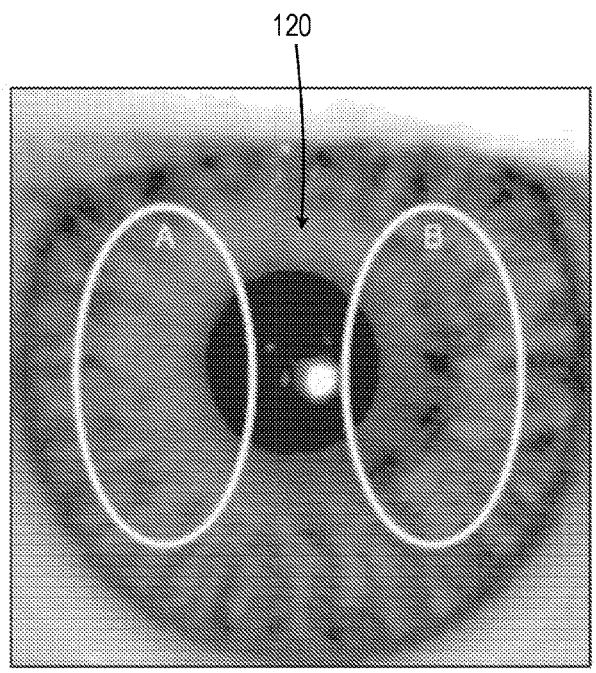

FIGS. 4A and 4B illustrate exemplary images captured by a system 100 for detecting a textured contact lens of an iris 120 with an intervening textured contact lens 130. The images shown correspond to images taken, for example, under the conditions shown in and described with reference to FIGS. 3A and 3B, with the image shown in FIG. 4A corresponding to the conditions presented in FIG. 3A (illumination by light source 112) and the image shown in FIG. 4B corresponding to the conditions presented in FIG. 3B (illumination by light source 114). Because of the optical obstructions caused by the opaque textures of the textured contact lens 130, the shadows cast on the iris 120 that are observable in image 4A (under illumination by light source 112) are different from the shadows cast on the iris 120 that are observable in image 4B (under illumination by light source 114). For example, region A of FIG. 4A includes shadowing and irregularities (e.g., caused by reflections similar to those represented by rays 136 and 140 of FIG. 3A) that are not present in region A of FIG. 4B (e.g., because of reflections similar to those represented by ray 134 in FIG. 3B). Additionally, region B of FIG. 4B includes shadowing and irregularities (e.g., caused by reflections similar to those represented by rays 138 and 142 of FIG. 3B) that are not present in region B of FIG. 4A (e.g., because of reflections similar to those represented by ray 132 in FIG. 3A). Also, other differences in the shadows present in FIGS. 4A and 4B are evident outside of regions A and B. Consequently, normal vectors estimated by a photometric stereo method will be highly variable, and many will differ substantially from the average normal vector estimated for the observed eye 122 with a textured contact lens 130 disposed thereon.

Figure 5A:
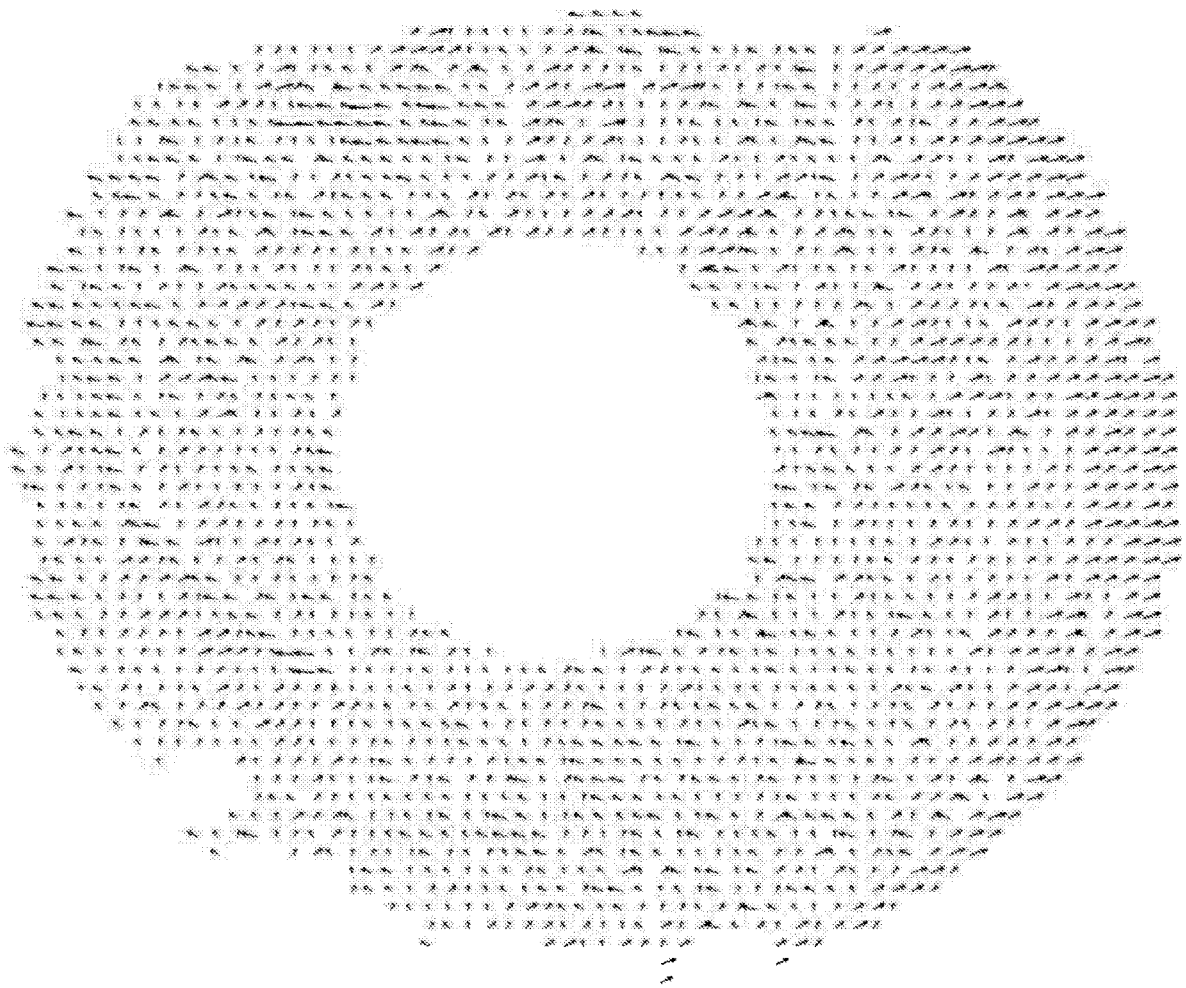
FIG. 5A illustrates a quiver plot of estimated normal vectors associated with an iris with no textured contact lens.

FIG. 5A illustrates a quiver plot of estimated normal vectors associated with a surface of an iris 120 with no textured contact lens disposed thereon, which may be based on images similar to those shown in and described with reference to FIGS. 2A and 2B. The vectors represented in the quiver plot may be determined or estimated, for example, by photometric stereo.

Photometric stereo is a computer vision method of estimating the surface normal vectors by observing an object under illuminations from different directions by a single fixed-position camera. Assuming that a system utilizes k point-like illuminators (e.g., in the exemplary systems shown in FIGS. 1A, 1B, 3A, and 3B, k=2) that generate k Lambertian reflections from each point of a surface with uniform albedo, the system may use following linear model to bind these quantities:

$$I_{x,y} = L\hat{n} = Lcn_{x,y}$$

where $I_{x,y}$ is a vector of the observed k intensities at a particular pixel (e.g., a pixel of any of the images represented in FIG. 2A, 2B, 4A, or 4B at position (x, y)), L is a 3×k matrix of k known light directions, c represents a uniform albedo, and $n_{x,y}$ is the surface unit normal vector to be estimated. This yields $$\hat{n} = \begin{cases} L^{-1} I_{x,y} & \text{if } k = 3 \\ (L^T L)^{-1} L^T I_{x,y} & \text{if } k \neq 3 \end{cases}$$

where $(L^T L)^{-1} L^T$ is the Moore-Penrose pseudoinverse of L. Assuming the albedo c is uniform for all points, the system can estimate the unit surface normal vectors as $$n_{x,y} = \frac{\hat{n}}{\|\hat{n}\|}$$

where $\|x\|$ is the $\ell^2$ (Euclidean) norm of x. Since two unknowns exist in Π, a minimum of k=2 images taken under two different lighting conditions (as shown in FIGS. 1A, 1B, 3A, and 3B) are necessary to solve for $n_{x,y}$. Those skilled in the art will recognize that if k≥3, the system may also recover albedo c for each picture point. Having more than three images (i.e., k>3) overdetermines the solution and allows for more accurate estimations of both $n_{x,y}$ and c. However, it should be re-iterated that the formulation of the PAD problem as a binary classification of the surface normal vectors of the observed texture does not require more than two images, which may prove particularly beneficial because many iris recognition sensors include two near-infrared light sources (i.e., for many existing iris recognition systems, k=2).

Figure 5B:
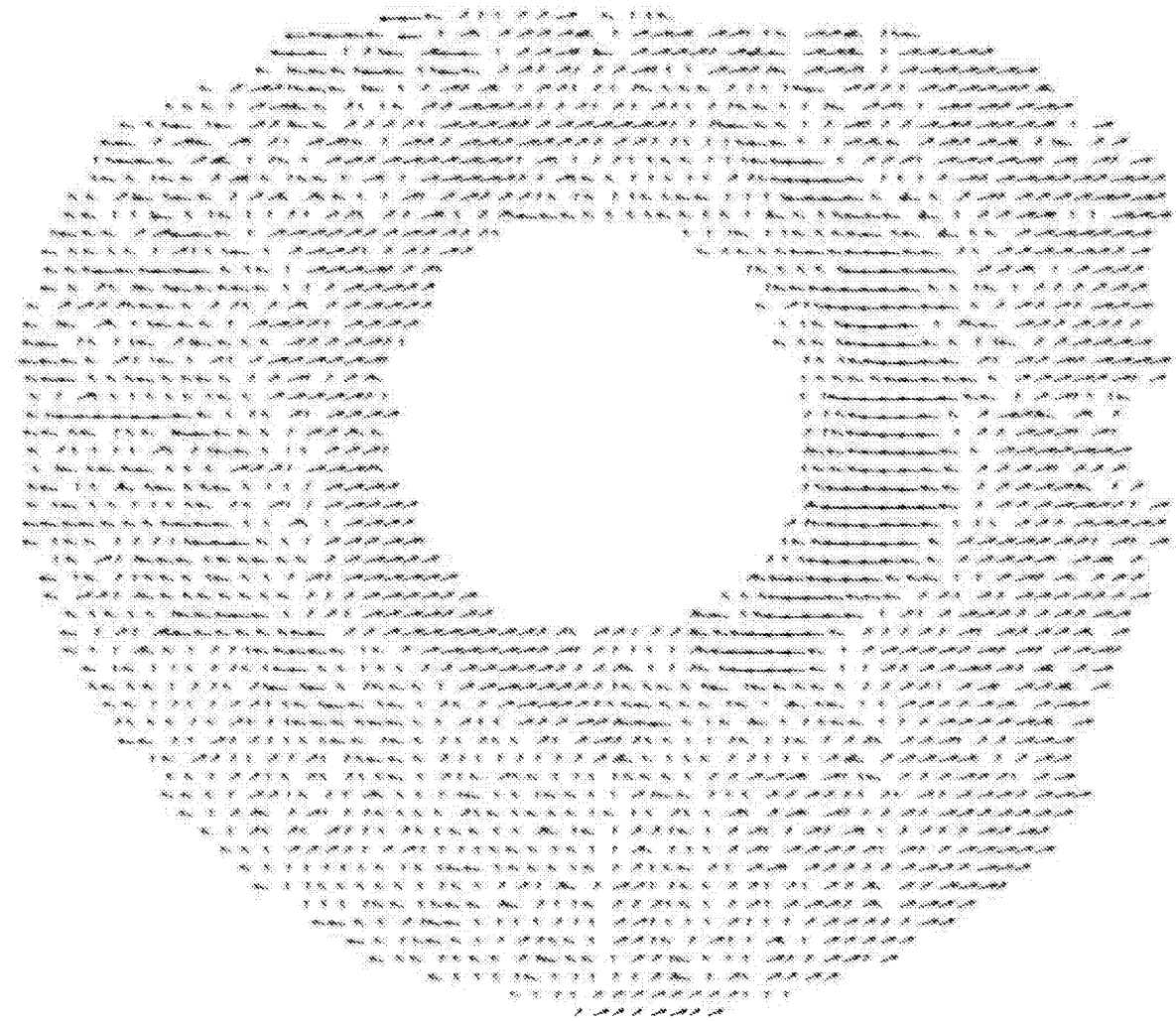
FIG. 5B illustrates a quiver plot of estimated normal vectors associated with an iris with a textured contact lens.

It should be noted that the quiver plots shown in FIGS. 5A and 5B do not include estimated surface normal vectors for all pixels of the images captured by the camera lens 110 (e.g., the images of FIGS. 2A, 2B, 4A, and 4B). In some embodiments, a system only estimates surface normal vectors for pixels that are part of the iris annulus and are nonoccluded. Pixels that are occluded by eyelids or eyelashes, for example, are omitted and the system does not calculate a surface normal vector for such pixels. By way of example, in a system where k=2, the system acquires two iris images (one for each illumination condition), and the observed intensities for each pixel (x, y) of the two iris images can be represented as:

$$I_{x,y} = \begin{bmatrix} I^{left}_{x,y} \\ I^{right}_{x,y} \end{bmatrix}$$

and occlusion masks $m^{left}$ and $m^{right}$ corresponding to $I^{left}$ and $I^{right}$ iris images. For nonoccluded iris pixels, $m_{x,y}=1$, and for background or other pixels, $m_{x,y}=0$.

The estimated surface normal vectors represented in the quiver plot of FIG. 5A may be calculated according to photometric stereo, as described above. As is qualitatively evident from the quiver plot shown, a significant number of the surface normal vectors are similar in magnitude and/or direction. Put differently, there appears to be little variability of the estimated normal vectors shown in FIG. 5A. This is particularly evident when the quiver plot of FIG. 5A is contrasted with the quiver plot shown in FIG. 5B, which illustrates a quiver plot of estimated normal vectors associated with a surface of an iris 120 with a textured contact lens 130 disposed thereon (e.g., based on images similar to those shown in and described with reference to FIGS. 4A and 4B). The surface normal vectors represented in FIG. 5B differ from one another more markedly in magnitude and/or direction than the vectors shown in FIG. 5A. There appears to be high variability of the estimated normal vectors shown in FIG. 5A.

An iris recognition system may also perform a quantitative analysis of the variability of the surface normal vectors determined from a set of images captured by a camera lens 110. A high variability indicates a greater likelihood that the eye presented to the iris recognition system was wearing a textured contact lens 130 at the time of presentation, whereas a low variability indicates a greater likelihood that the eye presented to the iris recognition system only included an authentic iris without a textured contact lens 130. For example, the variability of the estimated normal vectors of a set of k images may be determined based on a distribution of vector norms between all predicted normal vectors $n_{x,y}$ and the applicable average normal vector $\bar{n}$ within the nonoccluded iris area, where $$\bar{n} = \frac{1}{N} \sum_{x,y} n_{x,y}.$$

The Euclidean distances between normal vectors and their average are smaller for an approximately flat iris (e.g., an authentic iris) when compared to an irregular object (e.g., composed of an iris and a textured contact lens).

In some embodiments, the system calculates a variance of the Euclidean distance between the normal vectors and their average. For example, a system may calculate $$q=\text{var}(q)$$

where q is a vector composed of all elements of $q_{x,y}$, and $q_{x,y}=\|n_{x,y}-\bar{n}\|$, where $\|x\|$ is the $\ell^2$ (Euclidean) norm of x, N is the number of nonoccluded iris points, and $$\{(x,y): m_{x,y}^{left} \cap m_{x,y}^{right}=1\},$$

where $m^{left}$ and $m^{right}$ are occlusion masks corresponding to $I^{left}$ and $I^{right}$ iris images. For nonoccluded iris pixels, $m_{x,y}=1$, and for background or other pixels, $m_{x,y}=0$. The system may hold q to represent a PAD score. The PAD score is larger for irises wearing a textured contact lens than for irises not wearing a textured contact lens or a transparent contact lens (although a transparent contact lens will result in a lower PAD score than a textured contact lens). By way of example, the PAD score calculated by determining the variance of the Euclidian distance between the normal vectors of FIG. 5A and their average is q=0.048, while the PAD score calculated by determining the variance of the Euclidean distance between the normal vectors of FIG. 5B and their average is q=0.091. As expected, the PAD score corresponding to the presence of a textured contact lens is higher than the PAD score corresponding to the absence of a textured contact lens.

Figure 6:
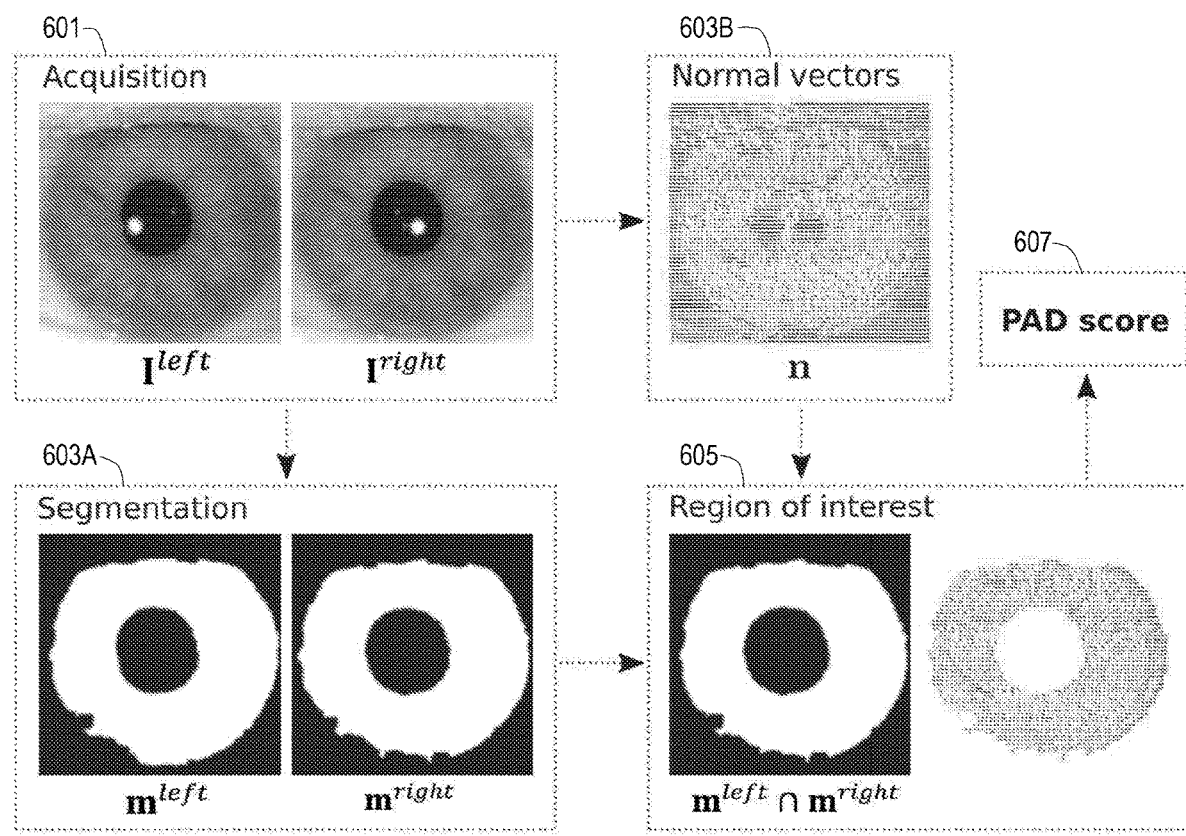
FIG. 6 illustrates exemplary components of a photometric stereo iris presentation attack detection method, according to the present disclosure.

FIG. 6 illustrates exemplary components of a photometric stereo iris presentation attack detection method, according to the present disclosure. In the example described in FIG. 6, an exemplary system utilizes a pair of illuminators for illuminating the presented eye (i.e., k=2). Correspondingly, in an acquisition phase 601, an iris recognition system acquires a pair of iris images, $I^{left}$ and $I^{right}$. In some instances, the system acquires the $I^{left}$ image when a left illuminator is switched on (while the right illuminator is switched off), and the system acquires the $I^{right}$ image when a right illuminator is switched on (while the left illuminator is switched off). Those skilled in the art will recognize that the order of image acquisition (whether left is first or right is first) is immaterial. Due to spontaneous oscillations in pupil size, it may be beneficial that the time between captures is as small as possible.

A segmentation phase 603A and a normal vector calculation phase 603B follow the acquisition phase 601. A system may perform the segmentation phase 603A and the normal vector calculation phase 603B sequentially, simultaneously, in parallel, and/or as parts of a single operation/calculation. In the segmentation phase 603A, the system determines the nonoccluded pixels of the images acquired in the acquisition phase 601. For example, the system may calculate occlusion masks $m^{left}$ and $m^{right}$ that correspond to the pair of iris images $I^{left}$ and $I^{right}$. For nonoccluded pixels (e.g., pixels that reflect the iris annulus), $m_{x,y}=1$, and for background and/or occluded pixels, $m_{x,y}=0$. In this regard, the system classifies each pixel of the images into a pixel class, such as iris texture, background, etc.

In the normal vector calculation phase 603B, the system may estimate normal vectors associated with the surface shown in the images acquired by the system in the acquisition phase 601. For instance, the system may perform photometric stereo to calculate normal vectors, $n_{x,y}$, based on the pair of iris images $I^{left}$ and $I^{right}$ on a per-pixel basis, as described hereinabove. The normal vectors $n_{x,y}$ may be represented by a quiver plot, as shown in FIG. 6 at the normal vector calculation phase 603B. It should be noted that the quiver plot shown in FIG. 6 includes normal vectors for pixels that are occluded and/or outside of the iris annulus and would be omitted in the segmentation phase 603A. The normal vectors are shown for the non-iris pixels to illustrate that the system may perform the normal vector calculation phase 603B before performing the segmentation phase 603A.

The system also sets a region of interest 605, corresponding to all pixels for which both $m^{left}$ and $m^{right}$ are equal to 1 (e.g., where $\{(x, y): m_{x,y}^{left} \cap m_{x,y}^{right} = 1\}$). The system discards or omits the normal vectors that are outside of the iris annulus or correspond to eyelids and/or eyelashes. It should be noted that, in some instances, the system sets the region of interest 605 before the normal vector calculation phase 603B. Setting the region of interest 605 before calculating normal vectors can save on computational resources since normal vectors for occluded and/or non-iris pixels are not calculated before being omitted. The quiver plot shown in FIG. 6 adjacent to the region of interest shows the normal vectors within the region of interest.

The system calculates a PAD score 607 based on the normal vectors within the set region of interest 605. In some instances, the system calculates a variance of the Euclidean distance between the normal vectors and their average, as described hereinabove. The PAD score allows the system to determine the presence of a textured contact lens (e.g., whether a person presented a textured contact lens to the iris recognition system). For example, in some implementations, the system compares the PAD score (based on the variance) with an acceptance threshold. The acceptance threshold may be based on reference data derived from other iris/textured contact lens images. In some embodiments, the acceptance threshold is dynamically updatable.

In some instances, the usefulness of the calculated PAD score for determining the presence of a textured contact lens in a presentation attack relies on the assumption that a natural or authentic human iris is flatter than the fraudulent object presented to the iris recognition sensor. In essence, the systems and methods of the present disclosure assume that the profile of a genuine iris approximates a plane, whereas the profile of a textured contact lens is irregular as compared to the profile of the genuine iris.

Figure 7:
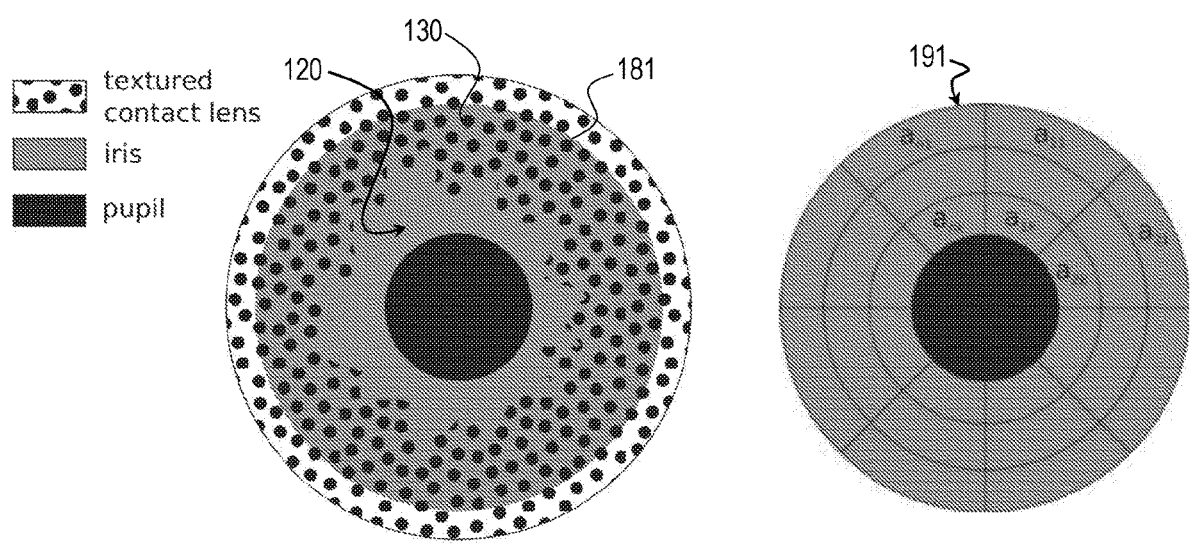
FIG. 7 illustrates a representation of a textured contact lens and exemplary sectioning of an iris annulus.

FIG. 7 illustrates a representation of a textured contact lens and exemplary sectioning of an iris annulus. In some embodiments, only certain local areas of the iris are utilized in determining the PAD score to increase the accuracy of the PAD score (rather than using the entire nonoccluded iris area). For example, the segmentation algorithm utilized (e.g., a free-from-occlusions iris pattern) may still contain occlusive objects, such as eyelids, eyelashes, or near-infrared reflections off of the cornea. Furthermore, the textured contact lenses are not always constructed to cover the entirety of an iris annulus. As shown in FIG. 7, for example, a textured contact lens 130 does not cover portions of the iris annulus 120 that are close to the pupil. As is also shown in FIG. 7, the textured contact lens 130 extends beyond the limbic iris boundary 181. Including such portions of an iris image can reduce the accuracy of the calculated PAD score.

In some instances, a system utilizes an iterative approach to determine the subsections of the iris area that are most important for PAD score accuracy. Then, in some instances, an iris recognition system utilizes only the most useful subsections for determining PAD scores for objects presented to the system. As with the PAD score acceptance threshold, the subsections used by an iris recognition system may be dynamically updated/changed.

The iterative approach may include segmenting the iris annulus into n radial and k angular sections, resulting in nk local subsections $a_{i,j}$ (as reflected in the sectioned annulus 191 of FIG. 7), for which the PAD scores can be calculated in the same way as for the entire nonoccluded iris area. The usefulness of each local area is assessed by how well two distributions of PAD scores calculated for irises with and without a textured contact lens are separated, as follows:

$$d' = \frac{\mu_{authentic} - \mu_{contact}}{\sqrt{0.5(\sigma_{authentic}^2 + \sigma_{contact}^2)}}$$

where $\mu_{authentic}$ and $\mu_{contact}$ represent the mean PAD scores of authentic irises and contact lenses, respectively, and or $\sigma_{authentic}$ and or $\sigma_{contact}$ denote the standard deviation of the PAD scores of authentic irises and irises with a textured contact lens, respectively. Therefore, a significance map of the iris annulus may be obtained, and it may be used in the search for the best iris mask.

Then, the system performs nk steps of the mask selection. In each step, the system includes local areas $a_{i,j}$ with the highest d' in the calculation of the PAD score:

$$q_{weighted} = \frac{\sum_{x,y} d'_{x,y} (l_{x,y} - l_w)^2}{\sum_{x,y} d'_{x,y}}$$

where $d'_{x,y}$ is the d' of the local area $a_{i,j}$ that point x,y is in, and $$l_w = \frac{\sum_{x,y} d'_{x,y} l_{x,y}}{\sum_{x,y} d'_{x,y}}$$

$$l_{x,y} = \|n_{x,y} - \bar{n}\|^2$$

After the PAD score calculation in each iteration, the system again calculates the d' of the two distributions of PAD scores for irises with and without a textured contact lens. The highest d' defines the final selection of local areas $a_{i,j}$ used in testing.

Methods for Iris Sensor Presentation Attack Detection

Figure 8:
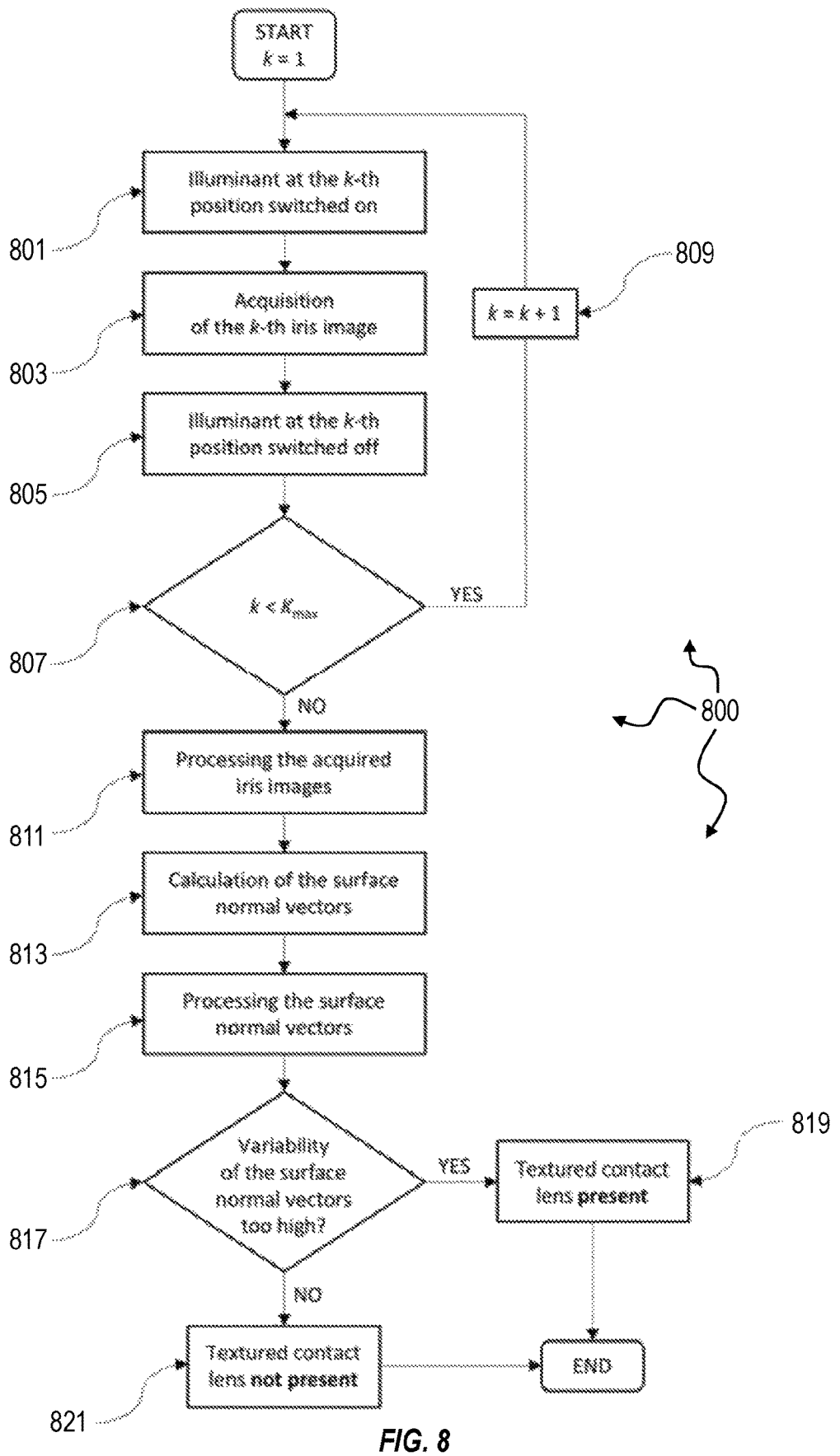
FIG. 8 illustrates an exemplary flow diagram depicting a method for iris sensor presentation attack detection, according to the present disclosure.

FIG. 8 illustrates an exemplary flow diagram 800 depicting a method for iris sensor presentation attack detection, according to the present disclosure. As used with reference to FIG. 8, k represents an index of the illuminants utilized by the system, the different lighting conditions under which the system acquires iris images, and/or the iris images that the system captures. At step 801, the illuminant at the k-th position becomes activated or turned on. At step 803, the system acquires the k-th iris image based on the lighting conditions of the presented iris when the k-th illuminant is turned on. At step 805, the illuminant at the k-th position becomes deactivated. At step 807, the system determines whether all desired iris images have been acquired. $K_{max}$ represents the total number of illuminants, lighting conditions, and/or iris images that will be utilized by the system. In some instances, the system determines whether $k < K_{max}$. If $k < K_{max}$, additional illuminants/lighting conditions/iris images are intended to be used/captured by the system, so the system increments the illuminant position for which an iris image will be captured (e.g., the system sets k=k+1, as shown at step 809). The system may then perform steps 801 through 805 for the new k value.

If the system determines that $k=K_{max}$, the system proceeds to step 811, wherein the system processes the acquired iris images. Processing may include a segmentation phase and/or identifying a region of interest utilizing pixel masks and/or determining regions of overlap for pixel masks applied to two or more iris images, as described above. At step 813, the system calculates the surface normal vectors for the processed iris images (e.g., for the region of interest identified for the iris images). The system may utilize photometric stereo, as described above, to calculate the surface normal vectors for the nonoccluded pixels of the iris images. Furthermore, a sectioned approach may be utilized, wherein surface normal vectors are only calculated and/or utilized for pixels within identified subsections of the iris images, as described above with reference to FIG. 7.

Upon acquiring surface normal vectors for the iris images on a per-pixel basis, the system proceeds to step 815, which involves processing the surface normal vectors. Processing the surface normal vectors may involve calculating the variance of the Euclidean distance between the surface normal vectors and their average, as described herein. The system may use the calculated variance to determine a PAD score.

Based on the processed surface normal vectors (e.g., based on the PAD score), the system determines at step 817 whether the variability of the surface normal vectors is too high. For example, in some instances, the system compares the PAD score (e.g., a measure of the variance) with an acceptance threshold (e.g., a predetermined threshold for a given dataset of iris images). The system may determine that a textured contact lens is present if the PAD score meets or exceeds the acceptance threshold (as reflected at 819). Alternatively, the system may determine that a textured contact lens is not present if the PAD score fails to meet or exceed the acceptance threshold (as reflected at 821).

Exemplary Computing Systems

Certain aspects of the presently disclosed embodiments may be carried out and/or implemented using a computing system (e.g., image acquisition/processing, calculating surface normal vectors, calculating variances, determining whether a threshold is met). Computing systems are increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system—or combination thereof—that includes at least one physical and tangible processor and a physical and tangible memory capable of having thereon computer-executable instructions that may be executed by a processor. The memory may take any form and may depend on the nature and form of the computing system. A computing system may be distributed over a network environment and may include multiple constituent computing systems.

In its most basic configuration, a computing system typically includes at least one hardware processing unit and memory. The memory may be physical system memory, which may be volatile, non-volatile, or some combination of the two. The term "memory" may also be used herein to refer to non-volatile mass storage such as physical storage media. If the computing system is distributed, the processing, memory, and/or storage capability may be distributed as well.

The computing system also has thereon multiple structures often referred to as an "executable component." For instance, the memory of the computing system is illustrated as including executable component. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors—as is the case if the executable component were binary. Alternatively, the structure may be structured to be interpretable and/or compiled—whether in a single stage or in multiple stages—so as to generate such binary that is directly interpretable by the processors. Such an understanding of exemplary structures of an executable component is well within the understanding of one of ordinary skill in the art of computing when using the term "executable component."

The term "executable component" is also well understood by one of ordinary skill as including structures that are implemented exclusively or near-exclusively in hardware, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination. In this description, the terms "component," "service," "engine," "module," "control," "generator," or the like may also be used. As used in this description and in this case, these terms—whether expressed with or without a modifying clause—are also intended to be synonymous with the term "executable component," and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory of the computing system. Computing system may also contain communication channels that allow the computing system to communicate with other computing systems over, for example, network.

While not all computing systems require a user interface, in some embodiments the computing system includes a user interface for use in interfacing with a user. The user interface may include output mechanisms as well as input mechanisms. The principles described herein are not limited to the precise output mechanisms or input mechanisms, as such will depend on the nature of the device. However, output mechanisms might include, for instance, speakers, displays, tactile output, holograms and so forth. Examples of input mechanisms might include, for instance, biometric sensors, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments of the invention can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium which can be used to store desired program code in the form of computer-executable instructions or data structures and which can be accessed and executed by a general purpose or special purpose computing system to implement the disclosed functionality of the invention.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Networks may be "private" or they may be "public," or networks may share qualities of both private and public networks. A private network may be any network that has restricted access such that only the computer systems and/or modules and/or other electronic devices that are provided and/or permitted access to the private network may transport electronic data through the one or more data links that comprise the private network. A public network may, on the other hand, not restrict access and allow any computer systems and/or modules and/or other electronic devices capable of connecting to the network to use the one or more data links comprising the network to transport electronic data.

For example, a private network found within an organization, such as a private business, restricts transport of electronic data between only those computer systems and/or modules and/or other electronic devices within the organization. Conversely, the Internet is an example of a public network where access to the network is, generally, not restricted. Computer systems and/or modules and/or other electronic devices may often be connected simultaneously or serially to multiple networks, some of which may be private, some of which may be public, and some of which may be varying degrees of public and private. For example, a laptop computer may be permitted access to a closed network, such as a network for a private business that enables transport of electronic data between the computing systems of permitted business employees, and the same laptop computer may also access an open network, such as the Internet, at the same time or at a different time as it accesses the exemplary closed network.

Transmission media can include a network and/or data links which can be used to carry desired program code in the form of computer-executable instructions or data structures and which can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Computer-executable instructions comprise, for example, instructions and data which, when executed at a processor, cause a general purpose computing system, special purpose computing system, or special purpose processing device to perform a certain function or group of functions. Alternatively, or additionally, the computer-executable instructions may configure the computing system to perform a certain function or group of functions. The computer executable instructions may be, for example, binaries or even instructions that undergo some translation (such as compilation) before direct execution by the processors, such as intermediate format instructions like assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, tablets, mobile telephones, PDAs, pagers, routers, switches, datacenters, wearables (e.g., glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A computer-implemented method for determining a presence of a textured contact lens on an eye, comprising:
    illuminating the eye with k illuminants, the k illuminants comprising at least two different illuminants placed at different angles relative to a camera;
    acquiring iris images using the camera, the acquired iris images comprising at least two images acquired under illumination by each of the k illuminants; and
    determining, using one or more processors, the presence of a textured contact lens based on an analysis of an estimated surface shape of a selected portion of an iris determined within the acquired iris images, wherein determining the presence of a textured contact lens comprises:
        calculating normal vectors to the observed surface based on the acquired iris images;
        calculating a nonoccluded portion of the iris annulus based on the acquired iris images;
        determining a variance of the normal vectors to the observed surface found within the nonoccluded portion of the iris annulus; and
        comparing the variance to an acceptance threshold and outputting a result indicating the presence of a textured contact lens if the variance exceeds the acceptance threshold.

2. The computer-implemented method of claim 1, wherein the selected portion of the iris comprises a nonoccluded portion of an iris annulus.

3. The computer-implemented method of claim 2, wherein the selected portion of the iris is identified by applying one or more occlusion masks to the acquired iris images.

4. The computer-implemented method of claim 1, wherein illuminating the eye with k illuminants comprises illuminating the eye with the at least two different illuminants successively.

5. The computer-implemented method of claim 1, wherein the at least two different illuminants are not positioned concentrically with a camera lens of the camera used to acquire the acquired iris images.

6. The computer-implemented method of claim 1, wherein the at least two different illuminants are positioned coplanar with a camera lens of the camera used to acquire the acquired iris images, such that the at least two different illuminants and the camera lens are positioned on a plane that is orthogonal to an optic axis of the camera lens.

7. The computer-implemented method of claim 1, wherein calculating the normal vectors ($n_{x,y}$) to the observed surface comprises calculating $n_{x,y}$ by way of a photometric stereo method.

8. The computer-implemented method of claim 7, wherein the photometric stereo method comprises:

$$n_{x,y} = \frac{\hat{n}}{\|\hat{n}\|},$$

where

-continued $$\hat{n} = \begin{cases} L^{-1}I_{x,y} & \text{if } k = 3 \\ (L^TL)^{-1}L^TI_{x,y} & \text{if } k \neq 3 \end{cases}$$

where $I_{x,y}$ is a vector of observed k intensities at each (x, y) pixel location of the acquired iris images, L is a 3×k matrix of k known light directions, $(L^TL)^{-1}L^T$ is a Moore-Penrose pseudoinverse of L, and $\|x\|$ is the norm of x.

9. The computer-implemented method of claim 1, wherein calculating the nonoccluded portion of the iris annulus comprises classifying each pixel within the acquired iris images into a pixel class.

10. The computer-implemented method of claim 9, wherein the pixel class comprises iris texture or background.

11. The computer-implemented method of claim 1, wherein determining the variance comprises calculating:

$$\text{var}\|n_{x,y} - \bar{n}\|$$

where $\|x\|$ is the norm of x, and $$\bar{n} = \frac{1}{N}\sum_{x,y} n_{x,y},$$

where N is a number of nonoccluded iris points, and $n_{x,y}$ comprises normal vectors calculated for the nonoccluded iris points.

12. The computer-implemented method of claim 1, wherein determining the presence of a textured contact lens comprises comparing the variance with an acceptance threshold for a given dataset of iris images.

13. The computer-implemented method of claim 12, wherein determining the presence of a textured contact lens comprises determining the iris is covered by the textured contact lens if the variance meets or exceeds the acceptance threshold.

14. The computer-implemented method of claim 1, wherein the selected portion of the iris includes one or more subsections of the acquired iris images for each of the k illuminants.

15. A computer system for determining a presence of a textured contact lens on an eye, comprising:
   one or more processors; and
   one or more storage devices having stored thereon computer-executable instructions that when executed by the one or more processors configure the computer system to perform at least the following:
      receive a plurality of iris images, each iris image of the plurality of iris images being acquired during illumination with one of k illuminants, the k illuminants comprising at least two different illuminants placed at different angles relative to a camera used to acquire the plurality of iris images; and
      determine, using the one or more processors, the presence of a textured contact lens based on an analysis of an estimated surface shape of a nonoccluded portion of an iris determined within the plurality of iris images, wherein determining the presence of the textured contact lens comprises:
         calculating normal vectors to an observed surface based on the plurality of iris images;
         calculating a nonoccluded portion of an iris annulus based on the plurality of iris images;
         determining a variance of the normal vectors to the observed surface found within the nonoccluded portion of the iris annulus; and
         comparing the variance to an acceptance threshold and outputting a result indicating the presence of a textured contact lens if the variance exceeds the acceptance threshold.

16. The computer system of claim 15, wherein the computer-executable instructions further cause the computer system to calculate the normal vectors ($n_{x,y}$) to the observed surface by calculating $n_{x,y}$ by way of a photometric stereo method.

17. The computer system of claim 16, wherein the photometric stereo method comprises:

$$n_{x,y} = \frac{\hat{n}}{\|\hat{n}\|},$$

where $$\hat{n} = \begin{cases} L^{-1}I_{x,y} & \text{if } k = 3 \\ (L^TL)^{-1}L^TI_{x,y} & \text{if } k \neq 3 \end{cases}$$

where $I_{x,y}$ is a vector of observed k intensities at each pixel location of the acquired iris images, L is 3×k matrix of k known light directions, $(L^TL)^{-1}L^T$ is a Moore-Penrose pseudoinverse of L, and $\|x\|$ is the norm of x.

18. The computer system of claim 15, wherein the computer-executable instructions further cause the computer system to determine the variance by calculating:

$$\text{var}(q)$$

where q is a vector composed of all elements of $q_{x,y}$, and $q_{x,y} = \|n_{x,y} - \bar{n}\|$, and $\|x\|$ and is the $l^2$ (Euclidean) norm of x, and $$\bar{n} = \frac{1}{N}\sum_{x,y} n_{x,y},$$

where N is a number of nonoccluded iris points, and $n_{x,y}$ comprises normal vectors calculated for the nonoccluded iris points, and
wherein determining the presence of a textured contact lens includes comparing the variance with an acceptance threshold.

* * * * *